United States Patent Office 3,613,329
Patented Oct. 19, 1971

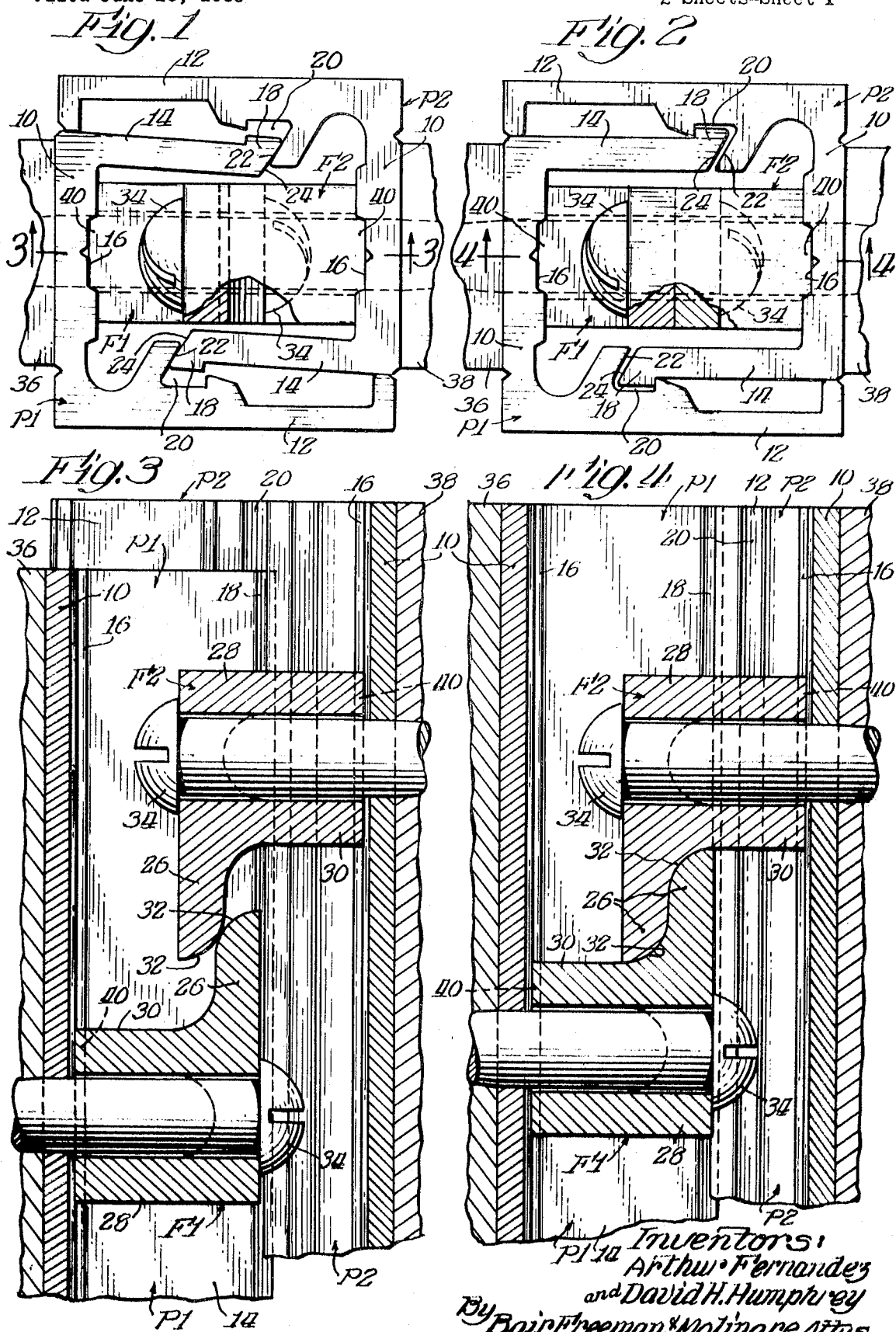

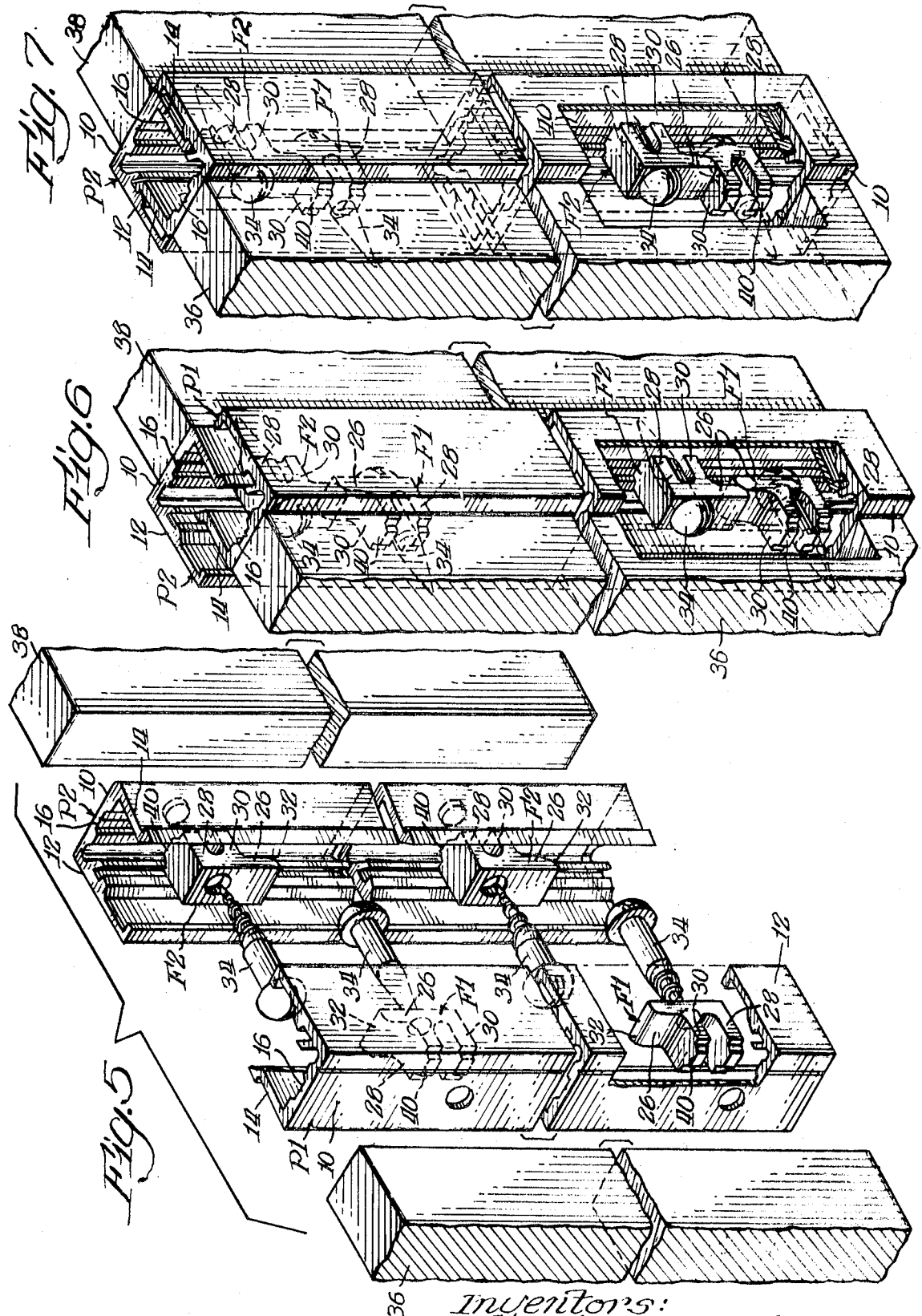

3,613,329
PANEL POST JOINING MEANS
Arthur Fernandez, Bayamon, and David H. Humphrey, San Juan, Puerto Rico, assignors to Orbit International, Inc., San Juan, Puerto Rico
Filed June 18, 1969, Ser. No. 834,438
Int. Cl. E04c *1/30, 3/30*
U.S. Cl. 52—582
9 Claims

ABSTRACT OF THE DISCLOSURE

Means is provided for joining panel posts together in such manner that partitions or the like formed of panels and post units may be readily assembled in a minimum of time and thereafter "knocked down" with equal facility. Channel-shaped posts are provided having the flanges thereof interfitting with each other and joined by means of finger wedges concealed inside the channel-shaped posts. The finger wedges are designed to coact with each other by first longitudinally offsetting one channel-shaped post relative to the other, and then sliding them to achieve final alignment, whereupon interlocking tongue and groove connections between the flanges of one channel-shaped member and the flanges of the other channel-shaped member so coact with each other that the two posts form a single substantially rectangular post. These channel-shaped posts may be formed as extrusions of metal, plastic or the like and used for assembling panels together by securing the channel-shaped posts to the edges of panels of wood, plastic, particle board or the like as by means of screws. The channel-shaped posts are provided with mating wedge surfaces so disposed as to spread the post flanges as the post webs are drawn toward each other by the finger wedges, and the spreading action effects entry of the tongues into the grooves of the flanges to attain final assembly of the two posts into a single rectangular post.

BACKGROUND OF THE INVENTION

Various means and fittings have heretofore been used for joining panel posts, but usually they are of the exposed type whereas our disclosure involves finger wedges as a means for securing channel-shaped posts together with the finger wedges entirely concealed inside the channels.

One object of our invention is to provide channel-shaped posts for attachment to the edges of panels, which posts may be economically formed of extruded metal or the like.

Another object is to provide a suitable design of extrusion profile which includes an interlocking connection between the flanges of one channel-shaped member and the flanges of the other when the finger wedges are engaged with each other to their maximum extent.

Still another object is to provide interfitting means between the post flanges in the form of tongues and grooves, together with wedge-like surfaces which bend the flanges laterally into interlocking position as between the tongues and the grooves as the finger wedges are moved relative to each other from an initial position to a final locked position.

A further object is to provide finger wedges in the form of fittings having fingers parallel to and spaced from the webs of the channel-shaped posts, screws or the like being used through the finger wedges and the webs of the posts into the edges of the panels for securing the posts and the finger wedges to the panel edges.

Still a further object is to provide spacing means for the wedge fingers in the form of a pair of spacing flanges, the ends of which contact the webs of the channel-shaped posts and are held in engagement therewith by the screws above mentioned.

BRIEF SUMMARY OF THE INVENTION

Extrusion type channel-shaped posts are adapted to coact with each other, the flanges of one interfitting in relation to the flanges of the other and held in the assembled position by finger wedges concealed inside the channel-shaped posts. Tongue and groove connections are provided between the flanges of one post and the flanges of the other one which are operable to spring the flanges laterally due to coaction of certain wedging surfaces of the flanges and the tendency of the finger wedges to pull the respective posts toward each other as one post is moved longitudinally relative to the other.

RELATED PENDING APPLICATION

The subject matter of this application is similar to that in applicants' copending application Ser. No. 807,323 filed Mar. 14, 1969.

BRIEF DESCRIPTION OF THE DRAWINGS

FIG. 1 is a plan view of a pair of posts and portions of adjacent panels secured thereto, the parts being shown in an initial position;

FIG. 2 is a similar plan view showing the parts in final assembled position;

FIG. 3 is a sectional view on the line 3—3 of FIG. 1, showing finger wedges beginning to engage with each other;

FIG. 4 is a sectional view on the line 4—4 of FIG. 2 showing the finger wedges completely engaged with each other and the parts therefor in final position;

FIG. 5 is an exploded perspective view of posts, panels and finger wedges before assembly;

FIG. 6 is a perspective view showing the posts, panels and finger wedges assembled and the fingers just being engaged as in FIG. 3; and FIG. 7 is a similar perspective view showing the final position of the parts as in FIG. 4.

DESCRIPTION OF THE PREFERRED EMBODIMENT

On the accompanying drawings we have used the reference characters P1 and P2 to indicate channel-shaped posts, and F1 and F2 to indicate finger wedges.

The elements or posts P1 and P2 are formed as extrusions of metal or the like having a web 10 and flanges 12 and 14. The posts P1 and P2 are further characterized by depressions 16 in the webs 10, tongues 18 on the flanges 14 and grooves 20 in the flanges 12. Adjacent the tongues and grooves are coacting wedge surfaces 22 and 24.

The finger wedges F1 and F2 are each characterized by fingers 26 which substantially parallel the webs 10, and spacer flanges 28 and 30 for spacing the fingers from the webs. The ends of the fingers 26 are tapered or rounded as indicated at 32 and the fingers are perforated for screws 34 which extend through the fingers, the webs 10 and into the edges of panels 36 and 38, thereby serving to simultaneously secure the finger wedges and the posts P1 and P2 to the panels 36 and 38 respectively. The finger wedges F1 and F2 are provided with beads 40 as shown in FIGS. 1 and 5 to fit the depressions 16 for the purpose of aligning the fingers with the posts when mounted, each by a single screw 34.

Once the finger wedges, posts and panels have been assembled, the posts may be easily and quickly joined together by offsetting the posts (one above the other as shown in FIG. 3) whereupon the tapered or rounded surfaces 32 of the fingers 26 initially engage. Thereafter the post P2 is moved downwardly relative to the post P1 by either pushing or driving it downwardly, as to aligned position of FIG. 4 where the upper end of the finger 26 of the finger wedge F1 engages the spacer flange 30 of the finger wedge F2 and the lower end of the finger of F2 engages the spacer flange 30 of the finger wedge F1.

The tapered or rounded finger ends 32 produces a wedging action that pulls the posts P1 and P2 toward each other (as from the position of FIGS. 1 and 3 to the position of FIGS. 2 and 4) which action produces a further interlocking of the flanges, that produced by laterally spreading the flanges 14 from the position of FIG. 1 to the position of FIG. 2 as the wedge surfaces 22 slide outwardly along the wedge surfaces 24. Thereupon the two channel-shaped posts are locked together as a substantially integral hollow rectangular post until such time as it is desirable to knock down the partition formed by post and panel units. Thereupon the longitudinal movement of one post relative to the other is reversed from the position of FIG. 4 to the position of FIG. 3, the flanges 14 springing back to their original position as shown in FIG. 1, and the two channel-shaped posts may then be pulled laterally apart.

From the foregoing specification it will be obvious that we have provided a relatively simple panel, post and finger wedge combination which, when the parts are once assembled, can be readily connected together for forming a wall of panels for a partition or the like, with the two parts of each post securely locked together yet capable of quick disassembly when required. The interference fit occasioned by the parts as illustrated in FIG. 3 both draws the webs of the posts P1 and P2 toward each other and interlocks the flanges thereof due to coaction of the tongue and groove connections following the coaction of the wedge surfaces 22 and 24 with each other which causes lateral spreading of the flanges 14 so that the tongues 18 enter the grooves 20.

While a single pair of wedge fingers has been illustrated, obviously there may be a pair adjacent the top and another pair adjacent the bottom of posts that are connected, together by the finger wedges as well as intermediate pairs if the posts are relatively long.

We claim as our invention:

1. Panel post joining means comprising a pair of channel-shaped elements each comprising a web having flanges thereon, said flanges interfitted with each other and said elements thereby forming together a substantially rectangular post, means for connecting each of said channel-shaped elements to the edge of a panel and the two panels thereby connected with each other by said channel-shaped elements, and means joining said channel-shaped elements to each other comprising finger wedges projecting toward each other from the webs of said channel-shaped elements and having fingers extending substantially parallel to said webs and in a direction longitudinally of said channel-shaped elements, said fingers being spaced from said webs to permit interlocking overlap thereof, the fingers of one wedge extending in a direction opposite the fingers of the other wedge and coacting with each other upon longitudinal movement of one channel-shaped element relative to the other channel-shaped element, said fingers being shaped to draw said channel-shaped elements toward each other upon one element being moved longitudinally relative to the other and said channel-shaped elements having interfitting tongues and grooves longitudinally on the flanges thereof and wedge surfaces on said tongues and on one wall defining said groove operable to cam said flanges laterally of said channel-shaped elements and move said tongues into said grooves to interlock said flanges when said fingers draw said channel-shaped elements toward each other.

2. Panel post joining means in accordance with claim 1 wherein the means for spacing said fingers from said webs also serve as stops for the ends of said fingers in the final position of said channel-shaped elements longitudinally relative to each other.

3. Panel post joining means in accordance with claim 1 wherein said wedge surfaces extend longitudinally of said channel-shaped elements, wherein cooperating wedge surfaces are substantially parallel to one another, and wherein said wedge surfaces are operable to move said flanges laterally of said channel-shaped elements and said tongues into said grooves when said fingers draw said channel-shaped elements toward each other.

4. Panel post joining means in accordance with claim 1 wherein means is provided for attaching each of said finger wedges to its respective element comprising a screw through the finger, through the space between the finger and the web of the channel-shaped element through said web and into the edge of a panel on which the channel-shaped element is mounted.

5. Panel post joining means in accordance with claim 4 wherein said wedge surfaces comprise longitudinally extending inclined surfaces operable to move said flanges laterally of said channel-shaped element when said fingers draw said channel-shaped elements toward each other to effect locking cooperation of said tongues and grooves.

6. Panel post joining means in accordance with claim 1 wherein the means for spacing said fingers from said webs comprises a pair of spacer flanges projecting from each finger and having their ends in contact with the webs of said channel-shaped elements.

7. Panel post joining means in accordance with claim 3 wherein means is provided for attaching each of said finger wedges to its respective element web comprising a screw through the finger, through the space between said pair of spacer flanges, through the web of the channel-shaped element and into the edge of a panel secured to said channel-shaped element by said screw.

8. Panel post joining means in accordance with claim 4 wherein said fingers have tapered ends adapted to draw said fingers toward each other and thereby the flanges of the channel-shaped elements into interfitting relationship with each other.

9. Panel post joining means in accordance with claim 5 wherein said fingers have tapered ends adapted to draw the fingers toward each other upon such longitudinal movement of one channel-shaped element relative to the other channel-shaped element and to thereby draw the webs of said channel-shaped elements toward each other.

References Cited

UNITED STATES PATENTS

| 638,494 | 12/1899 | Brock | 52—582 |
|---|---|---|---|
| 1,855,756 | 4/1932 | Garber | 52—731 |
| 2,114,388 | 4/1938 | Killion | 52—582 |
| 2,732,044 | 1/1956 | McClune | 52—284 |
| 2,766,488 | 10/1956 | Danielson | 52—582 |
| 3,072,227 | 1/1963 | Baker | 52—582 |
| 3,191,724 | 6/1965 | De Ridder | 52—588 |
| 3,206,898 | 9/1965 | Schroyer | 52—588 |
| 3,312,032, | 4/1967 | Ames | 52—731 |
| 3,327,440 | 6/1967 | Watkins | 52—582 |
| 3,037,593 | 6/1962 | Webster | 52—498 |

FRANK L. ABBOTT, Primary Examiner

J. L. RIDGILL, JR., Assistant Examiner

U.S. Cl. X.R.

52—588, 731